AUTOMATIC BLANKING-LEVEL CONTROL FOR
TELEVISION RECEIVERS
Filed July 9, 1948

INVENTOR.
JAMES LEONARD BLAYNEY
BY
Brown, Denk & Synnestvedt
AGENTS

Patented Sept. 5, 1950

2,521,146

UNITED STATES PATENT OFFICE 2,521,146

AUTOMATIC BLANKING-LEVEL CONTROL FOR TELEVISION RECEIVERS

James Leonard Blayney, Lansdale, Pa., assignor to Philco Corporation, Philadelphia, Pa., a corporation of Pennsylvania Application July 9, 1948, Serial No. 37,859

11 Claims. (Cl. 178—7.3)

The invention herein described and claimed relates to an improvement in television apparatus, particularly television receivers. More specifically, the present invention provides improved means for leveling the output signal of a video-frequency amplifier on the blanking pedestal.

Leveling of the composite video signal on the blanking pedestal is, of course, highly desirable in order that the blanking signal applied to the grid of the picture tube may be held at a fixed value as otherwise the background illumination of the picture reproduced by the television receiver may not correspond to that at the scene of the camera. Nevertheless, because it has been difficult heretofore to accomplish leveling on the blanking signals, it has been customary, in many prior art television receivers, merely to provide means adapted to level the output of the video-frequency amplifier on the tips of the synchronizing pulses, and well known signal-leveling or D.-C. reinsertion circuits are available for this purpose. In some cases, compromise measures have been adopted which effect leveling neither on the tips of the synchronizing pulses nor on the blanking pedestal and, in such cases, the point at which the signal is leveled tends to vary as the character of the picture signal changes.

It was stated above that it has been difficult, in television receivers, to level on the blanking pedestal. This difficulty arises from the fact that the amplitudes of the synchronizing pulses vary as the gain of the video amplifier is varied. Moreover, the amplitudes of the transmitted synchronizing and blanking signals are, in many cases, not uniform among the different transmitting stations, and, over a period of time, may vary with respect to a particular station. Consequently, while it is a relatively simple matter to level the output of the video amplifier on the tips of the synchronizing pulses, it has been difficult, heretofore, to shift the level from the tips of the synchronizing pulses to the blanking pedestal, for to do so, requires means capable of evaluating and utilizing in a proper manner the amplitude of the synchronizing pulses which, as indicated above, is a variable quantity.

It is an object of this invention to provide improved means for leveling the output of a video-frequency amplifier on the blanking signal, irrespective of variations which may occur in the amplitude of the synchronizing pulses.

Figure 1:
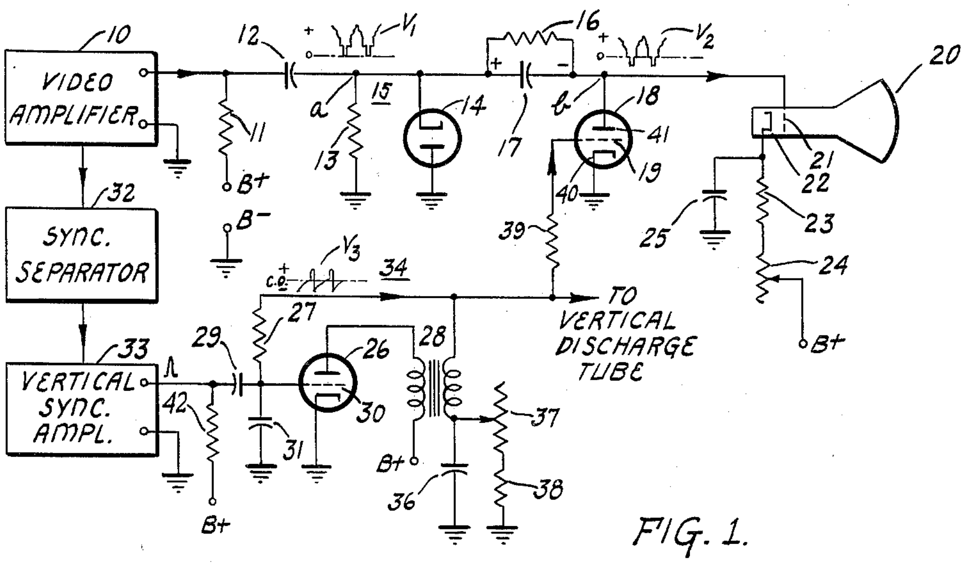
Figure 2:
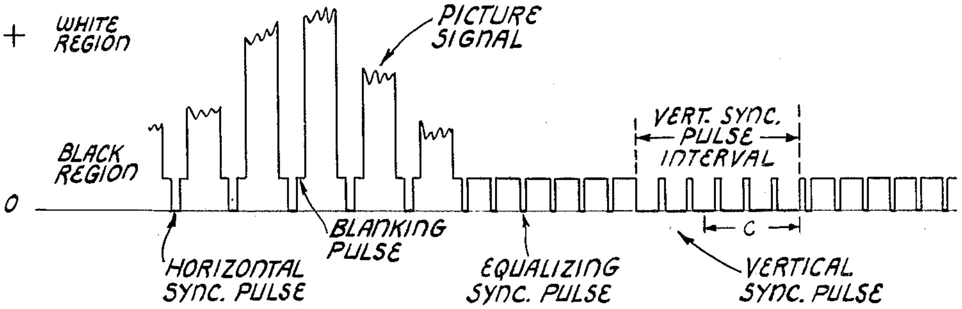
Figure 3:
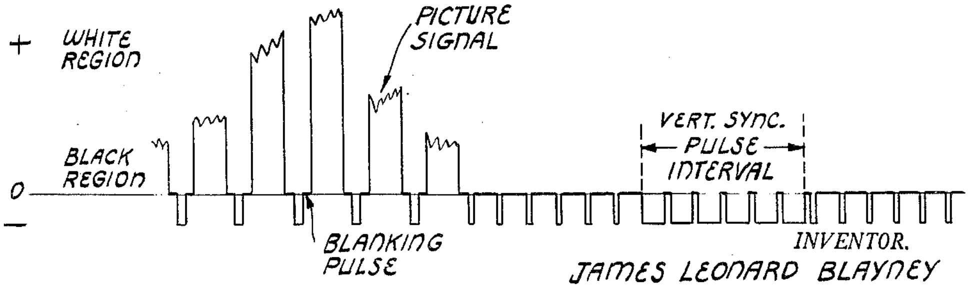

This and other objects, advantages and features of the present invention, and the manner in which the objects are attained, will become clear from the following detailed description and accompanying drawings wherein:

Figure 1 is a schematic representation of a portion of a television receiver circuit into which a preferred embodiment of the present invention has been incorporated; and Figures 2 and 3 are graphical representations which will be helpful in describing the present invention.

Referring now to Figure 1, block 10 represents the video-frequency amplifier of a conventional television receiver. Resistor 11 is the usual load resistor, across which the output signal of video amplifier 10 is developed, and the resistor is connected in conventional manner to a source of positive plate-supply voltage, B+. Capacitor 12 is a coupling capacitor which also functions as a component of a conventional signal-leveling circuit 15, in a manner to be described.

It will be understood that in order to function as a coupling capacitor, capacitor 12 must be of sufficient size to pass without appreciable attenuation, all of the frequencies of the composite video signal except the so-called D.-C. component, a slowly varying unidirectional component. Consequently, in the absence of a suitable signal-leveling circuit, the composite video signal on the right-hand plate of capacitor 12 would, over periods substantially in excess of a frame interval, tend to center about a zero alternating-current axis, with the areas of the waveform on each side of the said axis tending to be equal. In that case, neither the tips of the synchronizing pulses nor the blanking signals would be maintained along a fixed reference level, and both would vary continuously as a function of the average amplitude of the picture-signal component. This would, of course, be totally unsatisfactory, for the blanking signal would not only vary with variations in video gain, but would also vary with picture-signal content, and the background illumination at the picture tube would vary as a function of the average amplitude of the picture-signal component. To avoid such a condition, means have been heretofore provided in television receivers for leveling the composite video signal on the tips of the synchronizing pulses. While this avoids having the average picture illumination vary as the picture-signal content varies, it does not prevent changes in video gain from affecting the average picture illumination. This can only be accomplished by maintaining the blanking signal at a predetermined fixed value.

In accordance with my invention, after the composite video signal is leveled by conventional means on the tips of the synchronizing pulses, novel means then convert the signal from the synchronizing-signal level to the blanking-pedestal level. This is indicated graphically in Figure 1 wherein the video signal $V_1$ at point *a* is shown to be leveled on the tips of the synchronizing pulses while the video signal $V_2$ at point *b* is shown to be leveled on the blanking pedestal. The manner in which the conversion from the synchronizing-signal to the blanking-signal level is accomplished will be described in detail hereinafter. But first I will describe briefly the conventional components shown in Figure 1.

Coupling capacitance 12, shunt resistance 13 and diode 14 comprise a conventional signal-leveling circuit 15 which holds the negatively-extending synchronizing-signal peaks at a predetermined unvarying voltage level. In television practice, such circuits are frequently referred to as D.-C. reinsertion networks since they function to reintroduce the slowly varying unidirectional component of the video signal which is lost in the A.-C. coupled video amplifiers conventionally employed. In the circuit shown in Figure 1, the anode of leveler-diode 14 is connected to ground; hence, the tips of the synchronizing pulses of the video signal present at point *a* are leveled at ground or zero-voltage potential, as is illustrated graphically in Figure 2.

The preliminary step of leveling the composite video signal on the tips of the synchronizing pulses having been accomplished in conventional manner, the second and final step of converting from the synchronizing-signal level to the blanking-pedestal level remains to be achieved.

Included in the circuit shown in Figure 1 are a synchronizing-signal separator 32, a vertical synchronizing-signal amplifier 33, and a vertical blocking-tube oscillator 34. All of these components are conventional. The synchronizing-signal separator 32 functions in known manner to derive synchronizing pulses from the composite video signal passing through video amplifier 10. The synchronizing pulses are then applied, also in known manner, to the vertical synchronizing-signal amplifier 33. The output of vertical synchronizing-signal amplifier 33 comprises pulses of positive polarity which are applied, by way of a coupling capacitor 29, to an integrating network which comprises capacitor 31 and resistor 42. The vertical synchronizing signal developed across the capacitor 31 is applied to grid 30 of tube 26 of the vertical blocking-tube oscillator 34. Blocking-tube oscillator 34 is a well known type which includes a transformer 28 and an R. C. network comprising capacitor 36 and resistors 37, 38. The oscillator operates in well known manner and no description thereof is believed to be necessary.

As is indicated in Figure 1 by the arrow so marked, grid 30 of the blocking oscillator tube 26 is connected, by way of a resistor 27 and in conventional manner, to the grid of a vertical discharge tube (not shown) whose function is to produce the sawtooth voltage which, after amplification, is applied to the vertical-deflecting elements (not shown) of the cathode-ray picture tube 20. The well-known waveform of the voltage appearing on grid 30 and applied to the grid of the vertical discharge tube is indicated graphically in Figure 1, identified by the designation, $V_3$. It will be observed that grid 30 is negative during the relatively long non-conducting portion of the oscillator cycle but goes sharply positive for the brief period of time comprising the conducting portion of the cycle.

The means provided, in accordance with a preferred embodiment of my invention, for leveling the composite video signal on the blanking pedestals, will now be described.

Grid 30 of the vertical blocking oscillator tube 26 is connected, by way of an isolating resistor 39, to grid 19 of a triode 18 whose cathode 40 is connected directly to ground. As will become clear, triode 18 functions as a keyed or controlled diode. That is, triode 18 only operates as a diode when grid 19 is driven sharply above cutoff as a result of the occurrence of a vertical synchronizing pulse. The anode 41 of the keyed diode 18 is connected to control grid 21 of picture tube 20 and is also connected to the right-hand plate of a capacitor 17 which, in accordance with the present invention, is inserted serially into the video-signal circuit between the cathode of the previously-described leveling diode 14 and control grid 21 of picture tube 20. As previously described in connection with coupling capacitor 12, capacitor 17 must be sufficiently large to pass, without appreciable attenuation, all alternating components of the composite video signal above and including the vertical synchronizing signal whose frequency is only sixty cycles per second. Connected across capacitor 17 is a resistor 16. In a typical case, the capacitance of capacitor 17 may be of the order of 0.1 microfarad and the resistance of resistor 16 may be of the order of three megohms. The R. C. time constant of the discharge circuit comprising capacitor 17 and resistor 16 would then be 0.3 seconds, or about ten picture frames.

The manner in which the means just described functions to level the composite video signal on the blanking pedestal will now be readily understood. During the interval between vertical synchronizing signals, the potential of grid 30 of blocking oscillator tube 26 is negative, as indicated in Figure 1 by the negative portion of waveform $V_3$, and triode 18 is biased beyond cutoff. During this interval, picture and horizontal synchronizing signals corresponding to one complete field are applied, by way of capacitor 17, to grid 21 of picture tube 20. During this period, whatever charge had theretofore been developed on capacitor 17 is maintained substantially constant, for the R. C. time constant of the discharge circuit comprising elements 16 and 17 is very long relative to the duration of one picture field, and, with triode 18 biased beyond cutoff, no charging circuit for capacitor 17 exists.

During the latter portion of the vertical-synchronizing-pulse interval, as for example, during the interval designated *c* in Figure 2, grid 19 of tube 18 is driven above the plate-current-cutoff potential and tube 18 is rendered operative as a diode. During the interval *c*, capacitor 17 becomes charged, through the very low resistance of tube 18, to the peak-to-peak amplitude of the voltage then being applied to the left-hand plate of capacitor 17. Since, as will be seen from Figure 2, the voltage applied to the left-hand plate of capacitor 17 during the interval *c* comprises a portion of the serrated vertical synchronizing pulse, capacitor 17 becomes charged to a voltage equal to the amplitude of the vertical synchronizing pulse. The polarity of the charge is, of course, such that the left-hand plate of capacitor 17 is positive with respect to the right-hand plate.

During the long intervals between vertical synchronizing pulses, tube 18 is substantially nonconductive, and the charge on capacitor 17 is maintained substantially constant for, as previously described, the R. C. time constant of the discharge circuit, comprising capacitor 17 and resistor 16, is very long relative to a picture field.

It will be seen then that the composite video signal at point *b* in the circuit of Figure 1 is substantially identical in waveform to that at point *a*, but the signal at point *b* is less positive than that at point *a* by the amount of the voltage developed across capacitor 17. Since the tips of the synchronizing pulses at point *a* are leveled at ground potential and the voltage developed across capacitor 17 is equal to the amplitude of the vertical synchronizing pulse, and since the amplitude of the vertical synchronizing pulse is equal to the voltage difference between the tips of the synchronizing pulses and the blanking pedestal, the blanking signals of the composite video signal at point *b* must be leveled at ground potential, as is indicated graphically in Figure 3.

Assume now that the user of the television receiver adjusts the contrast control to increase the gain of the video amplifier. When this occurs, the video signal at point *a* will remain leveled on the tips of the synchronizing pulses, but the synchronizing pulses will increase in amplitude. However, the unidirectional voltage developed across capacitor 17 will also increase in magnitude and will substantially equal the increased amplitude of the synchronizing pulses. Consequently, the video signal at point *b* will remain leveled on the blanking signals.

In the circuit of Figure 1, I have employed ground potential as the fixed potential on which the tips of the synchronizing pulses at point *a* and the blanking signal at point *b* are leveled, and the cathode 22 of picture tube 20 is assumed to be biased positively to a value which just cuts off the picture tube when grid 21 is at ground potential. It is to be understood, however, that, if desired, a fixed reference level other than ground potential may be employed. For example, the anode of diode 14 and the cathode of triode 18 may be returned to a fixed voltage other than ground potential, and the necessary adjustment made to the positive voltage on cathode 22 of picture tube 20.

It will be seen that the means provided by the present invention and described above are capable of holding the blanking signal substantially at the cutoff bias of the picture tube, irrespective of changes in synchronizing percentage, picture contrast and over-all video gain. Stated another way, the means provided by the present invention automatically provide the reproduced picture with the proper background illumination irrespective of changes in video gain. The need for the manually-operated background control conventionally employed in television receivers is thus substantially eliminated.

The addition of elements 16, 17 and 18 to the prior art circuit does introduce some additional distributed capacitance to ground, but the amount is very small and no visible change in the video-frequency response is produced. The shunting capacitance due to triode 18 may, for example, be of the order of four micromicrofarads.

I have described novel means for utilizing the serrated vertical synchronizing signal for ascertaining the voltage difference between the tips of the synchronizing pulses and the blanking signal, for storing a voltage equal to said voltage difference, and for employing the stored voltage to shift the unvarying reference level of the composite video signal from the tips of the synchronizing pulses to the blanking pedestal.

It is to be understood that, while I prefer to use the vertical synchronizing signals for ascertaining the voltage difference between the tips of the synchronizing pulses and the blanking pedestal, I may, if desired, employ the equalizing synchronizing signals. Even the horizontal synchronizing signals, may, if desired, be employed, but the disadvantage of using the horizontal synchronizing signals is that the interval between pulses is so short that lead capacitances and inductances may have an effect on the time constants of the R. C. networks.

Having described my invention, I claim:

1. In a video amplifier; a source of video-frequency signal having blanking and synchronizing-pulse components, the synchronizing pulses being superimposed upon said blanking component; a signal-leveling circuit responsive to said signal for developing at a first point in said amplifier a video-frequency signal in which the peaks of said superimposed synchronizing pulses are maintained substantially at a predetermined unvarying reference level; a capacitor; a charging circuit for said capacitor, said charging circuit including a normally-open electronic switch serially connected with said capacitor across said signal-leveling circuit, said switch being adapted to be closed momentarily in response to a synchronizing pulse, to charge said capacitor to a unidirectional voltage equal substantially to the amplitude of said synchronizing pulses; and means for combining said unidirectional voltage developed across said capacitor with the video-frequency signal developed by said signal-leveling circuit to maintain, at a second point in said amplifier, the blanking component of said resultant video-frequency signal at substantially said predetermined unvarying reference level.

2. In a video amplifier; a source of video-frequency signal having blanking and synchronizing-pulse components, the synchronizing pulses being superimposed upon said blanking component; a signal-leveling circuit; means for applying said video-frequency signal to said leveling circuit, the video-frequency output signal of said leveling circuit being leveled on the peaks of the superimposed synchronizing pulses; utilization means for said video-frequency signal; a capacitor serially connected between said signal-leveling circuit and said utilization means; and a charging circuit for said capacitor, said charging circuit including a normally inoperative unilateral conducting device adapted to be rendered operative in response to a synchronizing pulse for developing and maintaining across said capacitor a unilateral voltage equal substantially to the amplitude of the synchronizing pulses and of such polarity that the video-frequency signal applied to said utilization means is leveled on the blanking component.

3. In a television receiver; a source of video-frequency signal having blanking and synchronizing-pulse components, the synchronizing pulses being superimposed upon said blanking component; a signal-leveling circuit; means for applying said video-frequency signal to said leveling circuit to produce, at a first point in said receiver, a video-frequency signal having the peaks of said superimposed synchronizing pulses substantially maintained at a predetermined unvarying reference level; a capacitor; a gated charging circuit, including a unilateral conducting device serially connected with said capacitor across said signal-leveling circuit, said unilateral conducting device being adapted to be rendered conductive in response to a synchronizing pulse, for charging said capacitor to a unidirectional voltage equal substantially to the voltage difference between said peaks of said superimposed synchronizing pulses and said blanking component; means maintaining said charge on said capacitor; and means for combining the video-frequency signal produced by said leveling-circuit and the unidirectional voltage developed across said capacitor in such sense that, at a second point in said receiver, the blanking component of the combined signal is maintained substantially at said predetermined unvarying reference level.

4. In a television receiver having a video amplifier and a source of composite video-frequency signal including blanking, horizontal-synchronizing-pulse and vertical-synchronizing-pulse components; a signal-leveling circuit; means for applying said composite signal to said leveling circuit to develop thereacross an output signal which is leveled on the tips of the synchronizing pulses; a capacitor; a cathode-ray picture tube having a control grid; means for applying the output signal of said leveling circuit to said control grid of said picture tube by way of said capacitor, said capacitor offering negligible impedance at substantially all alternating frequencies higher than and including the repetition frequency of said vertical synchronizing pulses; and a charging circuit, including a normally inoperative tube adapted to be rendered operative in response to and during the occurrence of at least a portion of a vertical synchronizing pulse, for maintaining said capacitor charged to a direct-current voltage substantially equal to the amplitude of said vertical synchronizing pulses, said voltage being of such polarity that the composite signal applied to the control grid of said picture tube is leveled on the blanking component.

5. In an electrical system; a source of composite signal, said signal including a recurrent pulse component; means for substantially maintaining, at a preselected point in said system, the peaks of said recurrent pulse component at a predetermined unvarying reference level; means, responsive to said recurrent pulse component, for deriving and maintaining a unidirectional voltage equal substantially to the amplitude of said recurrent pulse; and means for combining said derived unidirectional voltage with said peak-leveled composite signal to maintain, at a different preselected point in said system, the base of said pulse at substantially said predetermined unvarying reference level.

6. The combination claimed in claim 5 characterized in that the responsive means comprises a capacitor and a normally inoperative unilateral conducting device adapted to be rendered operative in response to said recurrent pulse component.

7. In an electrical system; a source of signal, said signal during certain predetermined recurrent intervals having a relatively large peak-to-peak amplitude subject to variation over relatively wide limits, said signal during other predetermined recurrent intervals having a relatively small peak-to-peak amplitude subject to variation over relatively narrow limits; means, effective at a preselected point in said system, for maintaining the signal peaks extending in a common direction during both of said recurrent intervals substantially at a predetermined unvarying reference level; means inoperative during said certain predetermined recurrent intervals and operative during said other predetermined recurrent intervals for deriving and maintaining a unidirectional voltage equal substantially to said relatively small peak-to-peak amplitude; and means for utilizing said derived unidirectional voltage to shift the level of said peak-leveled signal, at a different preselected point in said system, by an amount equal to said relatively small peak-to-peak amplitude.

8. In an electrical system; a source of signal, said signal during certain predetermined recurrent intervals having a relatively large peak-to-peak amplitude subject to variation over relatively wide limits, said signal during other predetermined recurrent intervals having a relatively small peak-to-peak amplitude subject to variation over relatively narrow limits; means for maintaining, at a preselected point in said system, the signal peaks extending in a common direction during both of said recurrent intervals substantially at a predetermined unvarying reference level; means, including a capacitor and a unilateral conducting device inoperative during said certain predetermined recurrent intervals and operative during said other predetermined recurrent intervals, for deriving and maintaining a unidirectional voltage equal substantially to said relatively small peak-to-peak amplitude; and means for utilizing said derived unidirectional voltage to shift the level of said peak-leveled signal, at a different preselected point in said system, by an amount equal to said relatively small peak-to-peak amplitude.

9. In a television system having a source of composite video-frequency signal, said signal during picture-field intervals having a relatively large peak-to-peak amplitude subject to variation over relatively wide limits, said signal during vertical-synchronizing-pulse intervals having a relatively small peak-to-peak amplitude subject to variation over relatively narrow limits; means for maintaining, at a preselected point in said system, the negatively-extending peaks of said composite video-frequency signal substantially at a predetermined unvarying reference level; means, including a capacitor and a unilateral conducting device inoperative during said picture-field intervals and operative during said vertical-synchronizing-pulse intervals, for deriving and maintaining a unidirectional voltage equal substantially to said relatively small peak-to-peak amplitude; and means for utilizing said derived unidirectional voltage to shift the level of said peak-leveled signal, at a different preselected point in said system, in a negative direction by an amount equal to said relatively small peak-to-peak amplitude.

10. In an electrical system; a source of complex alternating signal, said signal having a recurrent signal component intended to be maintained substantially at a predetermined unvarying reference level; means, effective at a preselected point in said system, for maintaining the signal peaks of one polarity substantially at said predetermined unvarying reference level; normally inoperative means made operative during selected occurrences of said recurrent signal component for deriving and maintaining a unidirectional voltage equal substantially to the voltage difference between said component and said predetermined reference level; and means for utilizing said derived unidirectional voltage to maintain said recurrent signal component, at a different preselected point in said system, substantially at said predetermined unvarying reference level.

11. In an electrical system; a source of complex alternating signal, said signal having a recurrent signal component intended to be maintained substantially at a predetermined unvarying reference level; means, effective at a preselected point in said system, for maintaining the signal peaks of one polarity substantially at said predetermined unvarying reference level; means, including a capacitor and a normally inoperative unilateral conducting device operative during selected occurrences of said recurrent signal component, for deriving and maintaining a unidirectional voltage equal substantially to the voltage difference between said component and said predetermined unvarying reference level;

and means for utilizing said derived unidirectional voltage to maintain said recurrent signal component, at a different preselected point in said system, substantially at said predetermined unvarying reference level.

JAMES LEONARD BLAYNEY.

REFERENCES CITED

The following references are of record in the file of this patent:

UNITED STATES PATENTS

| Number | Name | Date |
|---|---|---|
| 2,197,900 | Schlesinger | Apr. 23, 1940 |
| 2,259,538 | Wheeler | Oct. 21, 1941 |
| 2,307,387 | Blumlein | Jan. 5, 1943 |

FOREIGN PATENTS

| Number | Country | Date |
|---|---|---|
| 422,914 | Great Britain | Jan. 11, 1935 |